(12) United States Patent
Gilbert et al.

(10) Patent No.: US 8,700,022 B1
(45) Date of Patent: Apr. 15, 2014

(54) MOBILE COMMUNICATION DEVICE PROVISIONING AND MANAGEMENT

(71) Applicant: Sprint Communications Company L.P., Overland Park, KS (US)

(72) Inventors: Deborah L. Gilbert, Kansas City, MO (US); Carl J. Persson, Olathe, KS (US); Thomas H. Wilson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/939,173

(22) Filed: Jul. 10, 2013

Related U.S. Application Data

(62) Division of application No. 12/566,757, filed on Sep. 25, 2009, now Pat. No. 8,526,929.

(51) Int. Cl.
*H04M 3/00* (2006.01)

(52) U.S. Cl.
USPC ............ 455/419; 455/411; 455/418; 455/420

(58) Field of Classification Search
None
See application file for complete search history.

(56) References Cited

U.S. PATENT DOCUMENTS

| | | | |
|---|---|---|---|
| 6,356,543 B2 | 3/2002 | Hall et al. | |
| 7,239,877 B2 | 7/2007 | Corneille et al. | |
| 8,019,683 B1 * | 9/2011 | Swanburg et al. | 705/40 |
| 8,526,929 B1 | 9/2013 | Gilbert et al. | |
| 2002/0156904 A1 | 10/2002 | Gullotta et al. | |
| 2006/0234678 A1 | 10/2006 | Juitt et al. | |
| 2007/0254630 A1 | 11/2007 | Moloney et al. | |
| 2008/0070495 A1 * | 3/2008 | Stricklen et al. | 455/3.01 |
| 2008/0207167 A1 * | 8/2008 | Bugenhagen | 455/411 |
| 2009/0191846 A1 * | 7/2009 | Shi | 455/411 |

OTHER PUBLICATIONS

Pre-Interview Communication dated Mar. 1, 2012, U.S. Appl. No. 12/566,757, filed Sep. 25, 2009.
Final Office Action dated Jul. 27, 2012, U.S. Appl. No. 12/566,757, filed Sep. 25, 2009.
Advisory Action dated Sep. 17, 2012, U.S. Appl. No. 12/566,757, filed Sep. 25, 2009.
Office Action dated Dec. 12, 2012, U.S. Appl. No. 12/566,757, filed Sep. 25, 2009.
Notice of Allowance dated Apr. 24, 2013, U.S. Appl. No. 12/566,757, filed Sep. 25, 2009.

* cited by examiner

*Primary Examiner* — Rafael Perez-Gutierrez

(57) ABSTRACT

A mobile communication device provisioning and management system is provided. The system comprises a computer system and an application, that when executed on the computer system, receives instructions for provisioning a set of mobile communication devices, the instructions comprising a range of unique identifiers and user roles associated with the set. The system also receives a first message from a first mobile communication device, the first message containing a request for provisioning, a first unique identifier, a first user role, and a first user identifier. The system also matches the first unique identifier embedded in the first message with a unique identifier contained in the instructions. The system also matches the user role received in the first message with a user role specified in the instructions and sends a second message to the first mobile communication device, the second message containing provisioning information. The system also stores a record associating the first unique identifier, the first user role, and the first user identifier.

11 Claims, 6 Drawing Sheets

FIG. 5
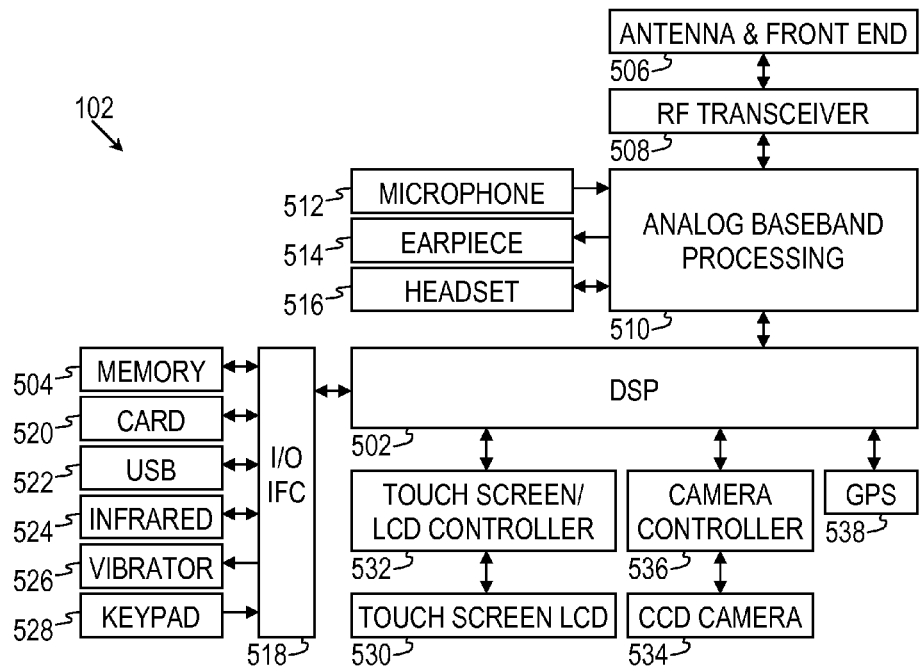
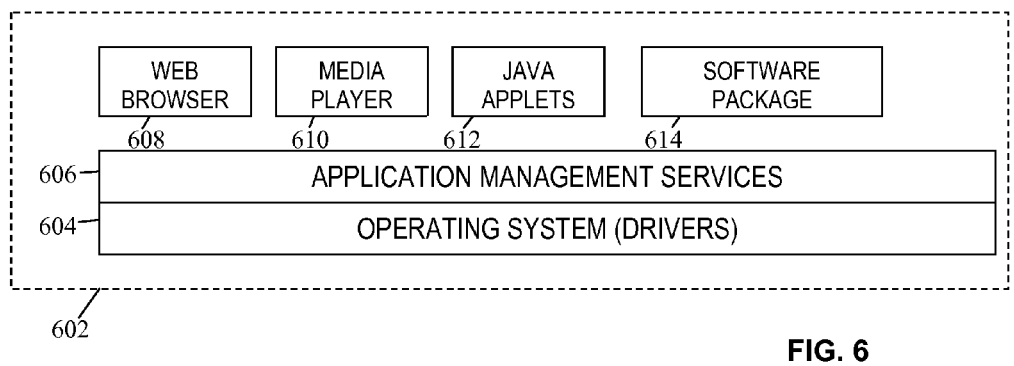
FIG. 6

US 8,700,022 B1

MOBILE COMMUNICATION DEVICE PROVISIONING AND MANAGEMENT

CROSS-REFERENCE TO RELATED APPLICATIONS

This application is a divisional of and claims priority under 35 U.S.C. §120 to U.S. patent application Ser. No. 12/566,757, filed on Sep. 25, 2009, entitled "Mobile Communication Device Provisioning and Management," by Deborah L. Gilbert, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large projects and job sites may employ hundreds or thousands of workers performing a wide variety of roles. Some construction sites may be hundreds of acres or several square miles in size. Many different employers may simultaneously employ workers on project and job sites and workers may be present on a site for varying lengths of time. Employers may interact in general contractor/subcontractor relationships. The large number of employees, their sometimes frequent movements, and the short term nature of their employment on large projects may lead to inefficiency and waste. Accurately measuring and tracking productivity in a complex services environment such as a large project can be problematic. Poor performance by a subcontractor or group of workers can disrupt the progress of an entire project. Maintaining accountability from subcontractors to general contractor to contracting organization may present significant challenges. Workers on a project site may have a variety of communications and data access needs. Worker productivity may be affected by workers' ability to communicate quickly with each other and with supervisors and to gain access to software applications and information needed to perform work and maintain job site safety.

SUMMARY

In an embodiment, a mobile communication device provisioning and management system is provided. The system comprises a computer system and an application, that when executed on the computer system, receives instructions for provisioning a set of mobile communication devices, the instructions comprising a range of unique identifiers and user roles associated with the set. The system also receives a first message from a first mobile communication device, the first message containing a request for provisioning, a first unique identifier, a first user role, and a first user identifier. The system also matches the first unique identifier embedded in the first message with a unique identifier contained in the instructions. The system also matches the user role received in the first message with a user role specified in the instructions and sends a second message to the first mobile communication device, the second message containing provisioning information. The system also stores a record associating the first unique identifier, the first user role, and the first user identifier.

In an embodiment, a processor-implemented method of mobile communication device provisioning and management is provided. The method comprises a provisioning server receiving a first message from a mobile communication device, the first message containing a request for provisioning information. The method also comprises the provisioning server matching a unique identifier contained in the first message with a unique identifier stored in a database. The method also comprises the provisioning server receiving a second message containing a verification of identity and associating the verified identity with a user role stored in the database. The method also comprises the provisioning server associating the verified identity and user role with the unique identifier and sending a third message to the mobile communication device, the third message containing provisioning information associated with the user role and the verified identity.

In an embodiment, a processor-implemented method of mobile communication device provisioning and management is provided. The method comprises a provisioning server provisioning a plurality of mobile communication devices at the beginning of a first time period with a first service associated with a first role. The method also comprises the provisioning server tracking usage of the first service during the duration of the first time period and the provisioning server de-provisioning the mobile communication devices at the end of the first time period. The method also comprises the provisioning server re-provisioning the mobile communication devices at the beginning of a second time period with a second service associated with a second role.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a block diagram of a portable electronic device according to an embodiment of the disclosure.

FIG. 6 is a block diagram of a software configuration for a portable electronic device according to an embodiment of the disclosure.

DETAILED DESCRIPTION

Figure 1:
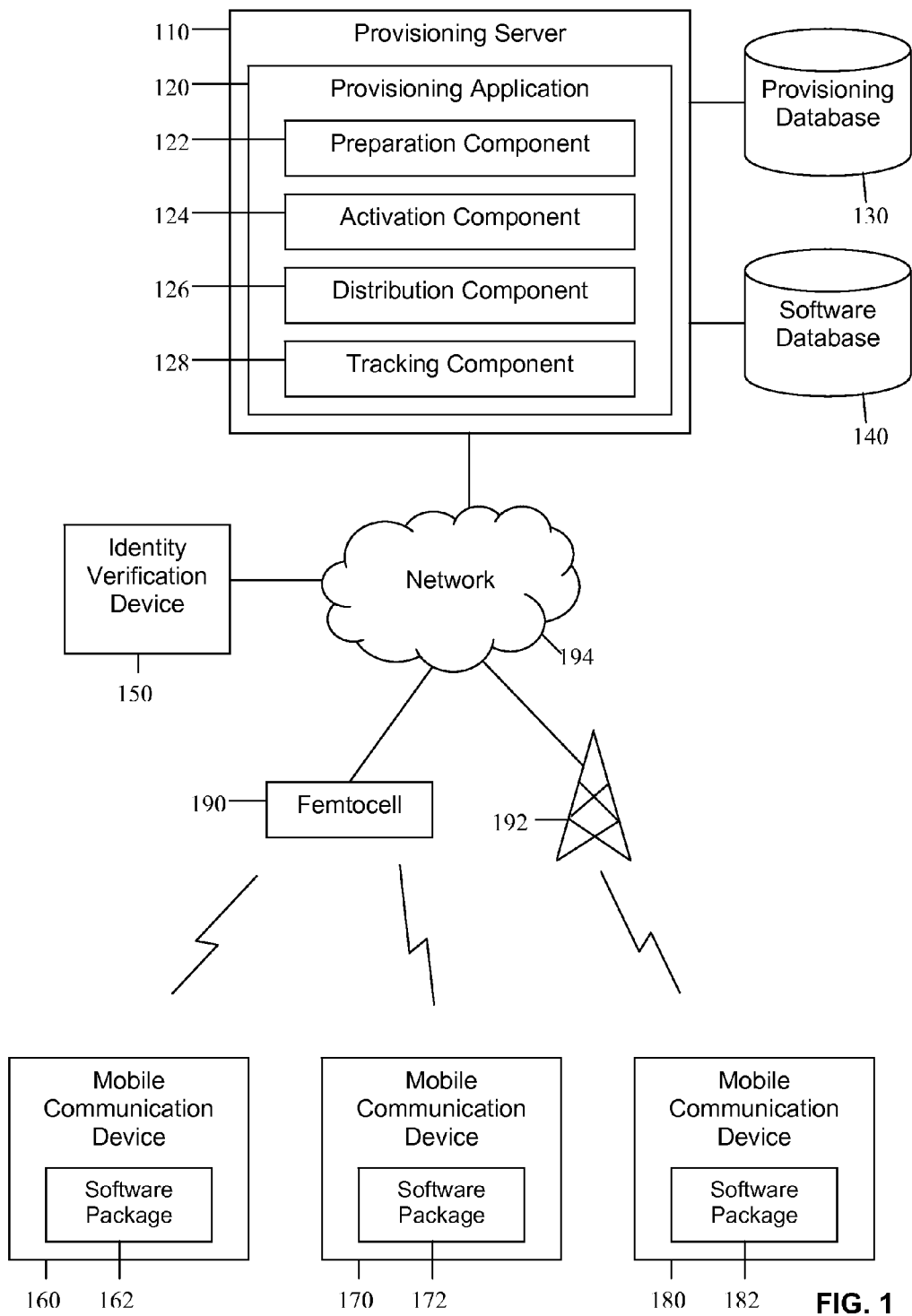
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a mobile communications device provisioning and management system permit an employer or contractor to receive a plurality of mobile communications devices, choose roles to which employees may be assigned, and provision software applications to the devices in accordance with the needs of each role and the quantity of employees assigned to each role. In a project or job site environment with employees on site for limited time durations, employees may need access to only software applications and communications capabilities specific to their job functions. When an employee begins a work period on site, the system assigns the employee a role associated with the employee's job classification and duties. Each role may be used to identify access to certain software applications. The device provided to the employee is provisioned only with those software applications used by the employee to perform the tasks associated with their role. The device may restrict access to specific software applications provisioned to the device and communications access to other authorized employees, usually those working on the job site with the same or similar role as well as supervisors. A job site may be provisioned with femtocells that promote wireless communication on the site. In an embodiment, the femtocell may be provisioned and/or configured to provide coverage to only those devices associated with the project. At the end of an employee's time on the job site, the employee returns the device to the employer and the device may be reprovisioned with different applications for a different employee working in a different role. The present disclosure teaches the regular entry and exit from a work environment of employees working in a variety of roles for a variety of periods of time.

In an embodiment, a plurality of mobile communications devices may be pre-provisioned in bulk at a retail or warehouse location prior to being provided to users. A set of devices may be provisioned across multiple roles on a strictly role-based basis. The system at the outset knows how many devices are to be provisioned for each role. The system also knows the specific applications to be provisioned for each role. The system may build software distribution packages and installation scripts for expedited provisioning to a bulk quantity of devices. As groups of devices are presented for provisioning, the system tracks the devices by their unique identifiers assigned to each role and may activate an automated software distribution routine to implement the provisioning without significant human intervention. The provisioning server maintains lists of mobile communications devices assigned to each role and may distribute software updates, messages, and alerts to groups of devices assigned to specific roles after the devices have been provided to users.

A general contractor on a work site may distribute mobile communication devices to employees of subcontractors hired to work on site for short durations, for example one week or one month. The employees may work in different groups of specialized job classifications or roles and may need devices provisioned with applications specific to the roles. The general contractor may track usage of applications by employees and may create billing accounts for later use in receiving reimbursement. The general contractor may achieve greater accountability, increased efficiency, and improved worker collaboration resulting in reduced costs and enhanced productivity and profitability.

Turning now to FIG. 1, a system 100 for mobile communication device provisioning and management is provided. The system 100 comprises a provisioning server 110, a provisioning application 120, a provisioning database 130, a software database 140, an identity verification device 150, mobile communication devices 160, 170, 180, software packages 162, 172, 182, a femtocell 190, a base transceiver system 192, and a network 194.

The provisioning server 110 may be a computer system. Computer systems are discussed in greater detail hereinafter. The provisioning server 110 may comprise one computer or a plurality of computers, for example, a server farm wherein many server computers cooperate to share a processing load. The provisioning server 110 may comprise a plurality of computers that are located at different places, for example, to provide geographical diversity and increased service reliability. The provisioning server 110 executes one or more applications including the provisioning application 120.

The provisioning application 120 executes on the provisioning server 110 and receives requests to provision mobile communication devices 160, 170, 180 with software applications and communications capabilities. In an embodiment, a plurality of users of mobile communication devices 160, 170, 180 performing different roles in a work environment of short term, temporary, or limited duration may need access to applications and communications capabilities that differ from one role to another. The provisioning application 120 receives information comprising a listing of a plurality of mobile communication devices 160, 170, 180 to be provisioned for the users with varying applications depending on the role of individual using the mobile communication device 160, 170, 180. The listing may contain a range of unique identifiers associated with the mobile communication devices 160, 170, 180. The information received may also contain a group of roles to which users of mobile communication devices 160, 170, 180 will be assigned when mobile communication devices 160, 170, 180 are provisioned with applications and provided to the users. The information may contain a description of software applications, tools, capabilities, access rights, and permissions associated with each role and instructions for invoking provisioning methods.

When mobile communication devices 160, 170, 180 are provisioned, the software applications, tools, capabilities, access rights, and permissions associated with the role designated for each user of the mobile communication devices 160, 170, 180 are installed on or otherwise provided to the mobile communication devices 160, 170, 180. When users are finished with the mobile communication devices 160, 170, 180 at the end of their time on the project or at the work site, they may turn in the mobile communication devices 160, 170, 180 they have been using. The mobile communication devices 160, 170, 180 may then be reprovisioned and made ready for a new group of users to enter the project location or work site, assume roles, and be provided fully provisioned mobile communication devices 160, 170, 180 for the duration of their work period.

The provisioning application 120 comprises the preparation component 122 that receives the listing of unique identifiers for mobile communication devices 160, 170, 180 and descriptions of the roles to which users of the mobile communication devices 160, 170, 180 will be assigned. The preparation component 122 also receives software applications and other software files associated with services that will be provisioned to mobile communication devices 160, 170, 180 and instructions for invoking provisioning methods. An employer, general contractor, employment contractor, or other organization or entity employing a plurality of individuals on a project or work site may wish some or all of the employees to carry mobile communication devices 160, 170, 180 while working at the site and possibly when away from the site. Depending on the job classification or role of an employee, the mobile communication device 160 provided to the employee may have certain software applications installed on the mobile communication device 160. On a large project, for example a construction project for a large building, a power plant, or an airport or the installation, testing, and cutover of a large data or telecommunications system, users on a site may perform a wide variety of roles. Each role may require a specific set of software applications and communications capabilities on assigned mobile communication devices 160, 170, 180 to perform the tasks associated with the role. Different levels of supervision may have all the applications of their subordinates plus additional capabilities.

At the beginning of an engagement on a project or work site, an employer or contractor may need to provision a large number of mobile communication devices 160, 170, 180 with various software applications for the plurality of roles. The employer or contractor receives the mobile communication devices 160, 170, 180 and stores the range or ranges of unique identifiers associated with the mobile communication devices 160, 170, 180 in the provisioning database 130. Unique identifiers are character strings that are permanently associated with mobile communication devices 160, 170, 180, usually by the manufacturer of the mobile communication devices 160, 170, 180. The preparation component 122 stores the unique identifiers in the provisioning database 130. Associated with the unique identifiers may also be a description of the mobile communication devices 160, 170, 180, for example manufacturer name and model number.

The preparation component 122 also receives the listing of the roles to which users employed on the project or work site will be assigned. In an embodiment involving a construction site, roles may include plumber, electrician, and crane operator. In an embodiment involving installation of an enterprise computer system, roles may include software architect, server software installer, and applications tester. The preparation component 122 stores the listing of the roles in the provisioning database 130 with the listing of the unique identifiers. The listing of the roles may include the quantity of employees to be assigned to each role and in an embodiment may include the names, employee numbers, badge numbers, or some other identification of employees to be assigned to each role. The listing of the roles may also include the software applications to be provisioned on mobile communication devices 160, 170, 180 for each role.

The preparation component 122 also receives the software applications and supporting files that will be installed on mobile communication devices 160, 170, 180. The preparation component 122 stores these software media in the software database 140. When the preparation component 122 receives the software applications, they may already be in bundled format and organized by role in virtual packages ready to install on mobile communication devices 160, 170, 180. The software applications alternatively may be provided in mass format with the installation packages for each role to be built by the provisioning application 120. In another embodiment, the software applications may not be fully formed when received by the preparation component 122 and may need to have a series of scripts and methods applied before the applications are ready to be assembled into installation packages.

In addition to the listings of unique identifiers associated with mobile communication devices 160, 170, 180, the roles to be associated with users, and the software applications and other media to be provisioned according to role, the preparation component 122 also may receive instructions for invoking provisioning methods of the software applications. The present disclosure teaches several methods for the provisioning of mobile communication devices 160, 170, 180 involving varying levels of user action. In an embodiment wherein a user actively initiates provisioning, the user may physically activate a mobile communication device 160, enter his or her designated role, and perhaps present an identification badge to the identity verification device 150 or provide a password or some other credential. The unique identifier associated with the mobile communication device 160 is contained in the electronic activation transmission invoked by the user and is matched with the list of unique identifiers stored in the provisioning database 130. The provisioning application 120 then provisions the mobile communication device 160 by electronically transmitting the software applications and other media corresponding to the user's role to the mobile communication device 160. In a contrasting embodiment, the provisioning application 120 may provision a plurality of mobile communication devices 160, 170, 180 at a retail or warehouse location without any user involvement and prior to users taking possession. The range of unique identifiers associated with mobile communication devices 160, 170, 180 targeted for installation and categories of roles would be read. The provisioning application 120 would access the requisite quantity and types of software applications from the software database 140 needed given the roles involved and initiate installation of software applications to the mobile communication devices 160, 170, 180 by activating a script or other series of commands.

The two provisioning scenarios briefly presented may represent alternative methods involving opposite bounds of active user involvement and no user involvement. Other embodiments may combine elements of the two scenarios described above. The preparation component 122 receives the provisioning instructions describing methods along with the unique identifiers, the roles, and the software applications to be installed. The methods of provisioning may depend on the type and size of project or job involved and the number of individual workers that will need to receive provisioned mobile communication devices 160, 170, 180. The methods may depend on the number of roles involved which may affect the quantity of software packages and applications to be provisioned and installed on the mobile communication devices 160, 170, 180. The methods of provisioning may depend on the nature and complexity of the roles performed by users of the mobile communication devices 160, 170, 180 and this may affect the complexity of the software to be installed. The provisioning method may depend on the durations of time spent by users grouped by role on a work location and the turnover of mobile communication devices 160, 170, 180 from one group of users and roles to another. The provisioning method may finally depend on the security needs and requirements associated with a project. On a large job site involving the construction of a military or intelligence installation, a diplomatic embassy, or a nuclear power plant, for example, a higher level of security may be required than for a work site wherein a large but ordinary commercial office building or shopping mall is being constructed.

The preparation component 122 receives the unique identifiers associated with mobile communication devices 160, 170, 180, the detailing of roles, the software applications, and instructions regarding the methods for provisioning the mobile communication devices 160, 170, 180 with the software applications. The preparation component 122 stores the unique identifiers, the information about the roles, and the instructions in the provisioning database 130 and stores the software applications and associated files in the software database 140. The preparation component 122 does not itself provision or install software on the mobile communication devices 160, 170, 180. The preparation component 122 stages the information about unique identifiers and roles, the installable software, and the instructions such that they are ready when provisioning is invoked using the appropriate method.

The provisioning application 120 also comprises the activation component 124 that receives a request to provision at least one mobile communication device 160. In an embodiment, a user reporting to a work site physically receives a mobile communication device 160 and powers it on or otherwise invokes a command that transmits a request to receive provisioning and installation of software applications. The user in the process may indicate the role assigned to the user by entering a voice command or keypad entry. The user also may provide a security credential by entering or speaking a password into the mobile communication device 160. The user may alternatively present an identification card to the identity verification device 150 that delivers a message indicating verification of user identity to the activation component 124. In an embodiment, a user taking possession of, powering on, and possibly entering a role and credential into a mobile communication device 160 may be unaware that the mobile communication device 160 is being provisioned with applications and other software. In an embodiment, many of the actions of the provisioning server 110 are transparent to a user of a mobile communication device 160.

When the mobile communication device 160 is powered on or the initiating command is otherwise invoked, the activation component 124 receives a message from the mobile communication device 160. Embedded in the message is the unique identifier for the mobile communication device 160. The activation component 124 extracts and reads the unique identifier and locates a matching unique identifier in the list of unique identifiers stored earlier in the provisioning database 130 by the preparation component 122.

The embedding of the unique identifier in the initial transmission to request provisioning may be automatic and transparent to the user. The unique identifier may be contained in the header of the initiating message. Because mobile communication devices 160, 170, 180 may use different technologies, unique identifiers may be expressed in a variety of formats. For example, mobile communication devices 160, 170, 180 manufactured to use the code division multiple access (CDMA) technology receive a unique identifier called a mobile equipment identifier (MEID). The unique identifier for mobile communication devices 160, 170, 180 manufactured with the global system for mobile communication (GSM), universal mobile telecommunications system (UMTS), and long-term evolution (LTE) technologies is called an international mobile subscriber identity (IMSI). Mobile communication devices 160, 170, 180 manufactured using the integrated digital enhanced network (iDEN) technology receive a unique identifier called an international mobile equipment identity (IMEI). In the cases described using these technologies, the unique identifiers are associated with the hardware of the mobile communication devices 160, 170, 180 and the unique identifiers do not normally change. In an embodiment, some mobile communication devices 160, 170, 180 are assigned unique identifiers by the wireless service providers selling the mobile communication devices 160, 170, 180 and for purposes of the discussion of the present disclosure, these assigned unique identifiers are recognized and used by the components of the system 100.

After the activation component 124 verifies that the unique identifier received in the initial message matches with a unique identifier contained in a list in the provisioning database 130, the activation component 124 then turns to the role that is to be associated with the mobile communication device 160. In an embodiment, the user may communicate the role by speaking or entering his or her role into the mobile communication device 160 and perhaps entering a credential for security purposes. The user may not have to enter a role because the entry of the credential alone may be adequate for the activation component 124 to locate the role in the provisioning database 130. In an embodiment, the user may present an identification card or other identification to the identity verification device 150 at about the same time the user takes possession of and powers on the mobile communication device 160. The identity verification device 150 reads the identification card and may pass the identity of the user on to the activation component 124. The magnetic characters read from the identification card may contain the role or they may point to an identity for the user stored in the provisioning database 130 that is associated with the role. The user may have no awareness of his or her role as defined herein.

The role is the title or job classification for the user that is associated with the software applications to be provisioned on mobile communication devices 160, 170, 180. When the preparation component 122 receives the information regarding the provisioning of mobile communication devices 160, 170, 180, it receives a detailing of the type and quantity of mobile communication devices 160, 170, 180 that will be assigned to each role. The information about roles received by the preparation component 122 and stored in the provisioning database 130 contains the quantity of each user and accompanying mobile communication device 160 to be assigned to each role. A computer infrastructure installation project for a large organization, for example, may employ 100 total users in four different roles comprising 50 field hardware installers, 30 field software installers and testers, 10 systems engineers, and 10 software architects, for example. The provisioning database 130 would contain 100 unique identifiers for the mobile communication devices 160, 170, 180 used by the 100 total users working on the project. In an embodiment, workers in different roles may be assigned to use different mobile communication devices 160, 170, 180 depending on the needs associated with the roles. The provisioning database 130 may contain information describing which mobile communication devices 160, 170, 180, designated by ranges of unique identifiers, are to be assigned to which roles.

As mobile communication devices 160, 170, 180 are presented for provisioning or are contacted by the provisioning server 110 in bulk for provisioning, the activation component 124 matches unique identifiers with roles. In an embodiment, the activation component 124 associates the matched unique identifier and role with the user who will be assigned to a mobile communication device 160. The user may be identified by name or in a more likely scenario, by an identification number possibly associated with a security badge or an employee number or other identifier entered or spoken into the mobile communication device 160.

When the mobile communication device 160, designated by unique identifier, has been associated with the role and the identity of the user, and the listings of the unique identifiers and roles in the provisioning database 130 have been marked and decremented, the process of provisioning software to the mobile communication device 160 may begin. Associated with the role are the instructions for the method of provisioning given the role and the mobile communication device 160 that will receive the provisioned software. The instructions for the method also may be found in the provisioning database 130 and are invoked by the activation component 124. The instructions describe what software is to be installed into and otherwise provisioned for the mobile communication device 160 and the method steps for how these actions are to be accomplished.

The provisioning application 120 also comprises the distribution component 126 that receives the instructions and assembles and installs the software applications and other components on the mobile communication devices 160, 170, 180. The actions of the distribution component 126 depend on the state of the software applications as they were received by the preparation component 122 and stored in the software database 140. In an embodiment, software applications to be used by mobile communication devices 160, 170, 180 may be received by the preparation component 122 in packaged and installable state wherein the distribution component 126 may need to execute only one or several commands to invoke an installation script for provisioning. The script may execute automated commands that draw the software applications from the software database 140 and send them along in prescribed order to the mobile communication devices 160, 170, 180 where they install and become software packages 162, 172, 182, ready to execute and provide services. In this embodiment, the processing demands and traffic load on the distribution component 126, the provisioning server 110, and the network 194 may be light. The instructions that invoke the method to convert software applications stored in the software database 140 to installed software packages 162, 172, 182 on the mobile communication devices 160, 170, 180 may contain scripts, pointers, and executable files that automate the installation process.

In a second and perhaps longer distribution and installation scenario, software applications stored in the software database 140 may need to be individually selected and assembled into installable packages by the distribution component 126 pursuant to the method associated with the particular mobile communication device 160 and role involved. Because each role may have different software requirements and needs for communications services, the distribution component 126 may have to create an installation script for each role if such scripts were not provided earlier to the preparation component 122. Creating the script may require first determining the order of build steps and installation of software applications for a combination of role and mobile communication device 160. Given the needs of a role, the distribution component 126 may have to determine which software applications to choose, determine how the software applications may interact with each other, determine the order in which they should be installed, and create the software build package.

Creating a software build package may involve more than selecting software applications, determining their interactions, and deciding on an order of installation. Provisioning mobile communication devices 160, 170, 180 may primarily comprise installing software applications but it also may comprise providing communications capabilities for data and voice transmission. Provisioning therefore may involve the installation and configuration of communications protocols and other supporting software. Provisioning also may comprise setting permissions so a mobile communication device 160 is able to communicate with another mobile communication device 170 in the possession of a peer or supervisor but is not enabled to communicate with yet a third mobile communication device 180.

In a third embodiment, the distribution component 126 may create the applications themselves as well as determine order of installation and create an installation script. Whereas in the initial scenario the distribution component 126 may have invoked a few commands to activate a previously created installation process of user-ready applications and in the second scenario the distribution component 126 developed the installation script and invoked it, in this third embodiment, the distribution component 126 builds the applications from executable files, dynamically linked libraries, and other basic software elements in accordance with the method described in the instructions for the role and the mobile communication device 160 involved. Once the applications have been created, the order of installation may be determined and installation can then be initiated by the distribution component 126.

The primary function of the distribution component 126 is to complete the provisioning of mobile communication devices 160, 170, 180. The distribution component 126 implements software build and installation methods as described in instructions received by the preparation component 122. The distribution component 126 begins its operations when the activation component 124 presents a mobile communication device 160 with a unique identifier, a role, and a set of provisioning instructions for the role, the provisioning instructions describing the software and services to be installed and the associated method. The distribution component 126 ends its activities when the software applications and other components are installed on the mobile communication devices 160, 170, 180, becoming user-ready software packages 162, 172, 182, and may be accessed.

The provisioning application 120 also comprises the tracking component 128 that observes and reports usage of software packages 162, 172, 182 by mobile communication devices 160, 170, 180. In an embodiment, a general contractor on a construction site or a vendor of information technology or telecommunications hardware and services may hire subcontractors to perform services on a project. A general contractor may hire an electrical contractor, an elevator vendor, and a paving contractor at the different times during the construction of an office building. A vendor of information technology hardware and services may hire value-added resellers and software development firms at various points to provide installation, deployment, and training services at a customer site during the installation of a new computer system. The general contractor or vendor may provide mobile communication devices 160, 170, 180 to the subcontractors for use by employees of the subcontractor in performing work on the project or being quickly reachable when off the project. In an embodiment, the general contractor may bill the subcontractors for use of software packages 162, 172, 182 while performing work. The tracking component 128 may also observe, record, and report the use of software packages 162, 172, 182 by mobile communication devices 160, 170, 180 for management purposes of users on job sites to assure compliance with work rules. In an embodiment, the physical movement of a mobile communication device 160 may be observed by the tracking component 128 and these movements may be recorded and reported. In an embodiment, a mobile communication device 160 only may be operative at certain geographic locations, for example on a job site, and/or may only be operative when within a certain distance of the user's identification card.

The provisioning database 130 is associated with the provisioning server 110 and stores unique identifiers associated with mobile communication devices 160, 170, 180, role information, and instructions for invoking methods to provision software on mobile communication devices 160, 170, 180. When a general contractor or other organization may be commencing work on a large project, it may receive the mobile communication devices 160, 170, 180 and create or receive electronic files that comprise a listing of unique identifiers associated with mobile communication devices 160, 170, 180. The general contractor also may receive the roles for the project as well as information identifying individuals that may seek provisioning of mobile communication devices 160, 170, 180 that have been assigned to them. The general contractor also may receive instructions for implementing methods of provisioning software applications and communications services on mobile communication devices 160, 170, 180. The unique identifiers, the role information, and the provisioning instructions are stored in the provisioning database 130 by the preparation component 122 of the provisioning application 120 and held there until the activation component 124 begins the process of provisioning.

The software database 140 is associated with the provisioning server 110 and stores the software applications and other software components that are provisioned and installed on mobile communication devices 160, 170, 180. Because the present disclosure teaches a number of methods for provisioning, the software database 140 may store software applications that are fully formed and ready to be installed as well as software elements that may comprise a variety of ingredients or building blocks such as dynamically linked libraries that are later combined by the distribution component 126 to form software applications. The present disclosure teaches the receipt by the preparation component 122 of finished and user-ready software applications, software elements that must be combined by the distribution component 126 to create software applications, and combinations thereof. The software database 140 stores software objects of each of these types for later provisioning. The software database 140 also stores electronic files associated with communications capabilities that may need to be provisioned and associated permissions.

The identity verification device 150 reads identification cards or other physical media presented by users when the users take possession of mobile communication devices 160, 170, 180. At about the same time that a user powers on or makes an entry into a mobile communication device 160 to begin provisioning, the user also may present an identification card to the identity verification device 150. The identity verification device 150 reads the identification card and sends the information read to the provisioning server 110. In an embodiment, the identity verification device 150 may be a badge reader. The activation component 124 of the provisioning application 120 may then use the information received from the identity verification device 150 to locate a record of the user associated with the identification card and determine the role to which the user is to be associated. This also enables location of the instructions for the provisioning method and further enables the choice of the software applications to be provisioned by the distribution component 126. In addition to the identity verification device 150 reading an identification card presented by the user, the user may be required to provide a credential to the identity verification device 150 or to the mobile communication device 160 that is to be provisioned. In an embodiment, the identity verification device 150 may not read an identity verification card presented by a user but instead may read some other media or receive an entry from the user. In an embodiment, the identity verification device 150 may receive a public key certificate or a biometric user identity comprising at least one of fingerprint, voice recognition, and retinal scan.

Mobile communication devices 160, 170, 180 are used by workers and other users at project and job sites to access software applications installed locally on the mobile communication devices 160, 170, 180 and accessible from other sources such as file servers (not shown). In an embodiment, workers, for example a group of plumbers, may be employed at a job site for a limited period, for example sixty days. During that time, some or all of the plumbers may need access to software applications that describe the specifications for the job and provide instructions for installing certain plumbing hardware. The plumbers also may need to communicate with each other. Mobile communication devices 160, 170, 180 could be provisioned for the plumbers at the beginning of their sixty day work period on the site. Mobile communication devices 160, 170, 180 may be mobile telephones and personal digital assistants (PDA).

Software packages 162, 172, 182 are the completed software applications and supporting software components provisioned and installed on the mobile communication devices 160, 170, 180. Software applications and elements thereof, while being stored in the software database 140 and while they are being processed by the distribution component 126, are not software packages 162, 172, 182. They become software packages 162, 172, 182 when they have been fully built, are installed on mobile communication devices 160, 170, 180, and are operative and available to the user. In an embodiment, software packages 162, 172, 182 that are provisioned and installed on mobile communication devices 160, 170, 180 also may include operating system software used by the software applications and other software components to access the hardware of the mobile communication devices 160, 170, 180. In an embodiment, the mobile communication devices 160, 170, 180 may have no functional value until provisioning takes place and the software packages 162, 172, 182 are installed and activated.

The femtocell 190, also known as an access point base station, may be a small cellular base station. In an embodiment, workers carrying mobile communication devices 160, 170, 180 may be situated at a project or job site in a physical area of limited size, for example twenty acres, and may need to communicate with each other and access information from a file server (not shown) located on the site. The femtocell 190 facilitates wireless communication between the mobile communication devices 160, 170, 180 in the confined physical area. While FIG. 1 depicts only one femtocell 190 serving the mobile communication devices 160, 170, 180 in an embodiment, a plurality of femtocells 190 may be installed on a work site. As mobile communication devices 160, 170, 180 are moved about the work site, they may make contact with more than one femtocell 190 to maintain communications.

In an embodiment, the femtocell 190 may be configured to limit access to some mobile communication devices 160, 170, 180 on a project or job site and deny access to others. In an embodiment, only explicitly authorized mobile communication devices 160, 170, 180 may be granted coverage by the femtocell 190. In an embodiment, settings may alternatively or in addition be configured in mobile communication devices 160, 170, 180 to access coverage provided by the femtocell 190.

The base transceiver station 192 may be any of cellular wireless base stations, for example a Code Division Multiple Access (CDMA), Global System for Mobile Communications (GSM), Universal Mobile Communications System (UMTS), and/or Long-term Evolution (LTE) cellular wireless base station; a World-wide Interoperable Microwave Access (WiMAX) base station; a WiFi access point; or other wireless access devices.

The network 194 promotes communication between the components of the system 100. The network 194 may be any communication network including a public data network (PDN), a public switched telephone network (PSTN), a private network, and/or a combination thereof.

While much of the discussion to this point has been directed to embodiments of the present disclosure in which mobile communication devices 160, 170, 180 are provisioned individually, and often when initiated by users, in an embodiment a plurality of mobile communication devices 160, 170, 180 may be provisioned in an automated manner with no user involvement. Such provisioning could be completed at a retail or warehouse location prior to the mobile communication devices 160, 170, 180 being provided to users at a project or work site. In a few steps, the provisioning application 120 could match unique identifiers with roles, choose software from the software database 140, and provision the mobile communication devices 160, 170, 180. In an embodiment, the subscriber identity modules (SIM) cards of the mobile communication devices 160, 170, 180 could be fed to the provisioning server in an automated manner for provisioning.

Figure 2:
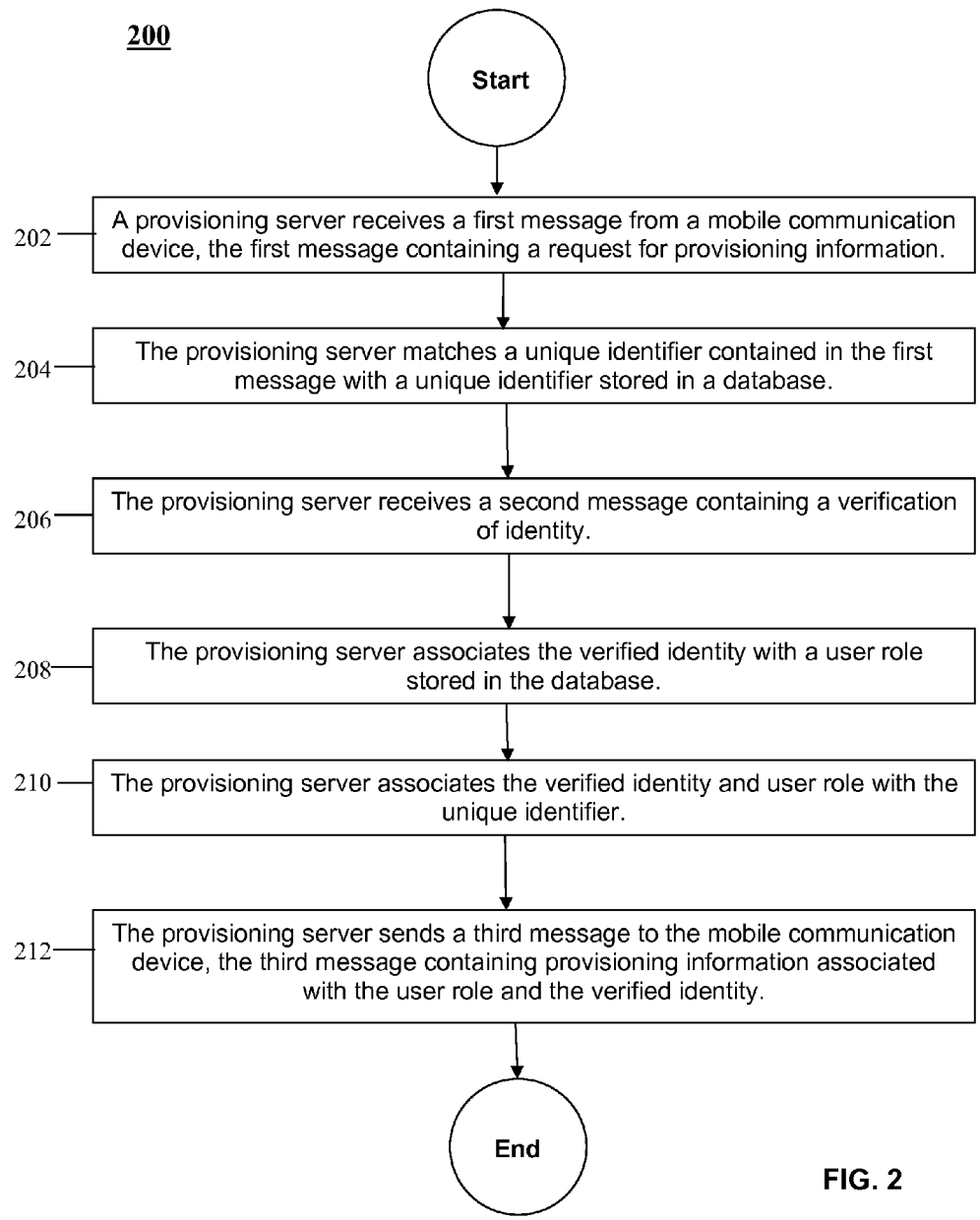
FIG. 2 is a flow chart illustrating a method according to an embodiment of the disclosure.

Turning now to FIG. 2, a processor-implemented method 200 of mobile communication device provisioning and management is provided. Beginning at block 202, the provisioning server 110 receives a first message from the mobile communication device 160, the message containing a request for provisioning information. The user of the mobile communication device 160 powers on or makes a key or voice entry into the mobile communication device 160 indicating a request for provisioning.

At block 204, the provisioning server 110 matches a unique identifier contained in the first message with a unique identifier stored in the provisioning database 130. The first message from the mobile communication device 160 requesting provisioning also contains in its header or elsewhere its unique identifier. The activation component 124 extracts the unique identifier embedded in the first message and locates a matching unique identifier stored in the provisioning database 130. This process of matching provides assurance that the mobile communication device 160 is one of the mobile communication devices 160, 170, 180 designated to be provisioned by the provisioning server 110.

At block 206, the provisioning server 110 receives a second message containing a verification of identity. The second message is received by the activation component 124 from the identity verification device 150 when the user of the mobile communication device 160 presents his or her identification card or other media to the identity verification device 150. The identity verification device 150 also may require a credential to be entered before it provides verification to the provisioning server 110. In an embodiment, the provisioning server 110 receives the second message containing verification of identity from the identity verification device 150 at about the same time that the provisioning server 110 receives the first message requesting provisioning from the mobile communication device 160. In an embodiment, a user arriving at a project or work site may take possession of the mobile communication device 160 to be used while on the site, power on the mobile communication device 160 or make a keypad entry to initiate provisioning, and present an identification card to the identity verification device 150, these actions occurring at about the same time.

At block 208, the provisioning server 110 associates the verified identity with a role for the user. The activation component 124 uses the verified identity of the user to enter the provisioning database 130 and locate the role associated with the user. The activation component 124 may have alternatively received notice of the role from the user by the user having made an entry into the mobile communication device 160 and supporting the entry with a credential. The activation component 124 also accesses from the provisioning database 130 the instructions used to invoke the provisioning method for the role involved.

At block 210, the provisioning server 110 associates the verified identity and the role with the unique identifier associated with the mobile communication device 160 at block 204. The activation component 124 brings together the verified identity, the role, and the instructions for invoking the provisioning method, linked at block 208, with the unique identifier that was determined to be valid at block 204. The activation component 124 has staged of the components needed for provisioning.

At block 212, the provisioning server 110 sends a third message to the mobile communication device 160, the third message containing provisioning information associated with the role and the verified identity. The distribution component 126 locates the software applications and other components described in the instructions in the software database 140 and invokes the provisioning method described in the instructions. The distribution component 126 installs the software applications on the mobile communication device 160. The software packages 162, 172, 182 installed on the mobile communication device 160 become ready for use by the user.

Figure 3:
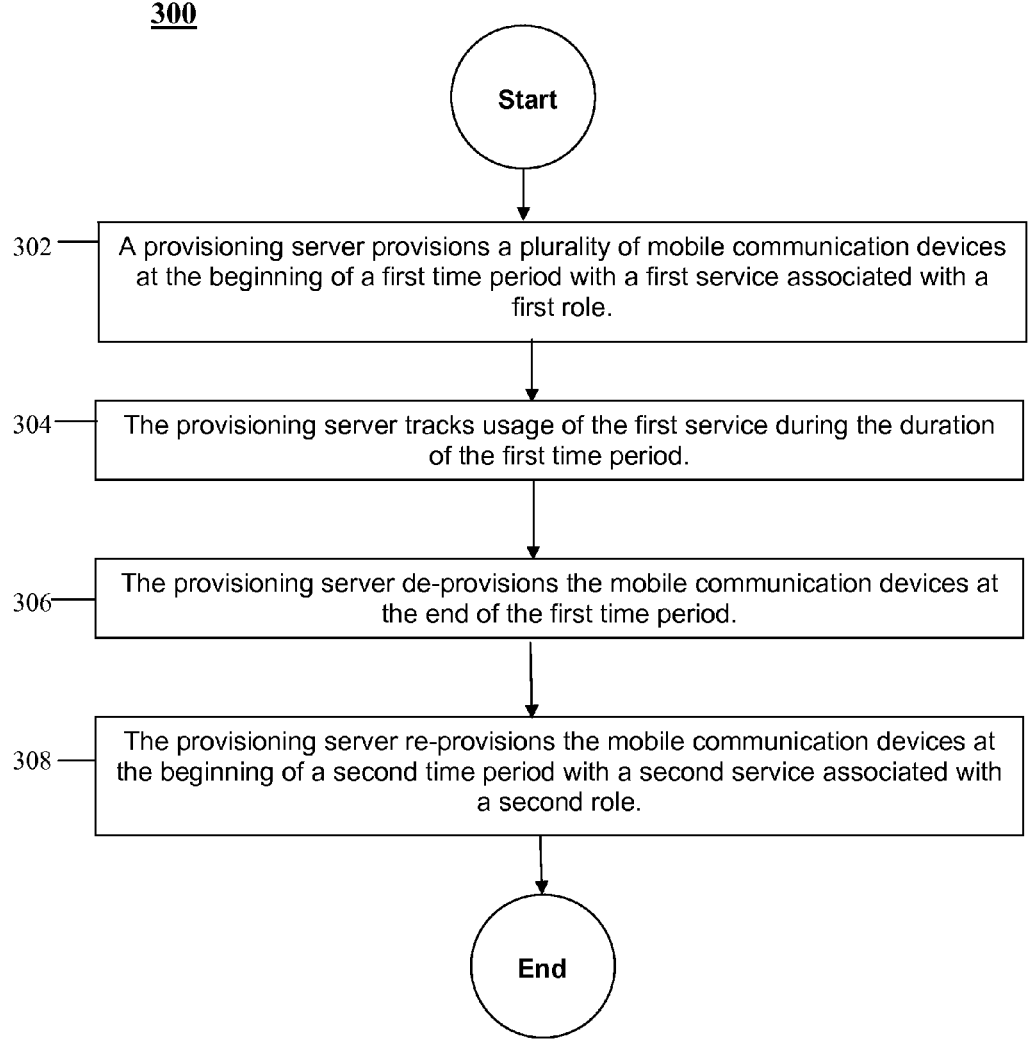
FIG. 3 is a flow chart illustrating another method according to an embodiment of the disclosure.

Turning now to FIG. 3, a processor-implemented method 300 of mobile communication device provisioning and management is provided. Beginning at block 302, the provisioning server 110 provisions a plurality of mobile communication devices 160, 170, 180 at the beginning of a first time period with a first service associated with a first role. In an embodiment, a vendor of mainframe computer systems and workstations may hire a value added reseller local to the vendor's customer to assist in the installation of a large mainframe system and several hundred user workstations at the customer's site. Among other roles, the reseller may employ twenty workstation installation engineers to install the workstations at the site, conduct testing, and assure that the workstations connect with the mainframe system. The mainframe vendor as a general contractor may wish the twenty workstation installation engineers employed by the reseller to carry mobile communication devices 160, 170, 180 with them on the installation site as they install the workstations. The mainframe vendor may direct that the mobile communication devices 160, 170, 180 carried by the workstation installation engineers are outfitted with certain software packages 162, 172, 182 that comprise applications related to the workstations. The applications may include product and installation information about the workstations. The applications also may enable the engineers to communicate with each other while on the site. In addition, two supervisors overseeing the work of the engineers also carry mobile communication devices 160, 170, 180 with the same applications as well as additional software.

At block 302, the provisioning server 110, which may be operated by the vendor of the mainframe system and user workstations, provisions the twenty mobile communication devices 160, 170, 180 with a first service for a first role for a first time period, the first service comprising a plurality of software applications and communications capabilities for use by individuals in the first role, in this example the workstation installation engineers while on site. The first time period is the amount of time that the workstation installation engineers employed by the value added reseller will be working on the site on behalf of the mainframe and workstation vendor to install the user workstations. In an embodiment, the first time period may be three weeks, the time that it takes to install the several hundred user workstations that will be accessing information from the mainframe system that may also be installed on the site at the same time. At block 302, the provisioning server 110 installs the software packages 162, 172, 182 on the mobile communication devices 160, 170, 180 for use by individuals in the workstation installation engineer role for the three week time period at the site.

At block 304, the provisioning server 110 tracks usage of the first service during the duration of the first time period. While the workstation installation engineers are on site and using the mobile communication devices 160, 170, 180 provisioned for them, the tracking component 128 of the provisioning application 120 monitors the use of the software packages 162, 172, 182 by the engineers and may record the usage in an account. In an embodiment, the mainframe vendor, as operator of the provisioning server 110, may bill its customer, the purchaser of the mainframe system and user workstations, for use of the mobile communication devices 160, 170, 180 by the installation engineers as part of the workstation vendor's overall contract with its customer.

At block 306, the provisioning server 110 de-provisions the mobile communication devices 160, 170, 180 at the end of the first time period. When the twenty workstation installation engineers on site have completed their installation of the several hundred user workstations and have made certain that the workstations connect properly with the vendor's mainframe system, the engineers' work is finished and they return the mobile communication devices 160, 170, 180 to the vendor. The provisioning server 110 de-provisions the mobile communication devices 160, 170, 180 by deleting the software packages 162, 172, 182 from the mobile communication devices 160, 170, 180.

At block 308, the provisioning server 110 re-provisions the mobile communication devices 160, 170, 180 at the beginning of a second time period with a second service associated with a second role. The workstation installation engineers have departed from the site and twenty software installers replace them to install client software on the workstations, test the software, and make sure that the client software on the workstations connects properly with several enterprise applications installed on the mainframe system. In this example, it is estimated that the twenty software installers may be present on the site for five weeks because they are responsible for assisting users of the workstations in learning how to use the client software and access the mainframe applications. The twenty software installers also will be responsible to resolve any software problems or "bugs" that arise during installation of the software on the client workstations. At block 308, the provisioning server 110 provisions the second service, or software packages 162, 172, 182 on the mobile communication devices 160, 170, 180, for use by the twenty software installers for their use while on the site. The software packages 162, 172, 182 used by the twenty software installers may be different from the software packages 162, 172, 182 used previously by the workstation installation engineers on the mobile communication devices 160, 170, 180 during their time on the site.

Figure 4:
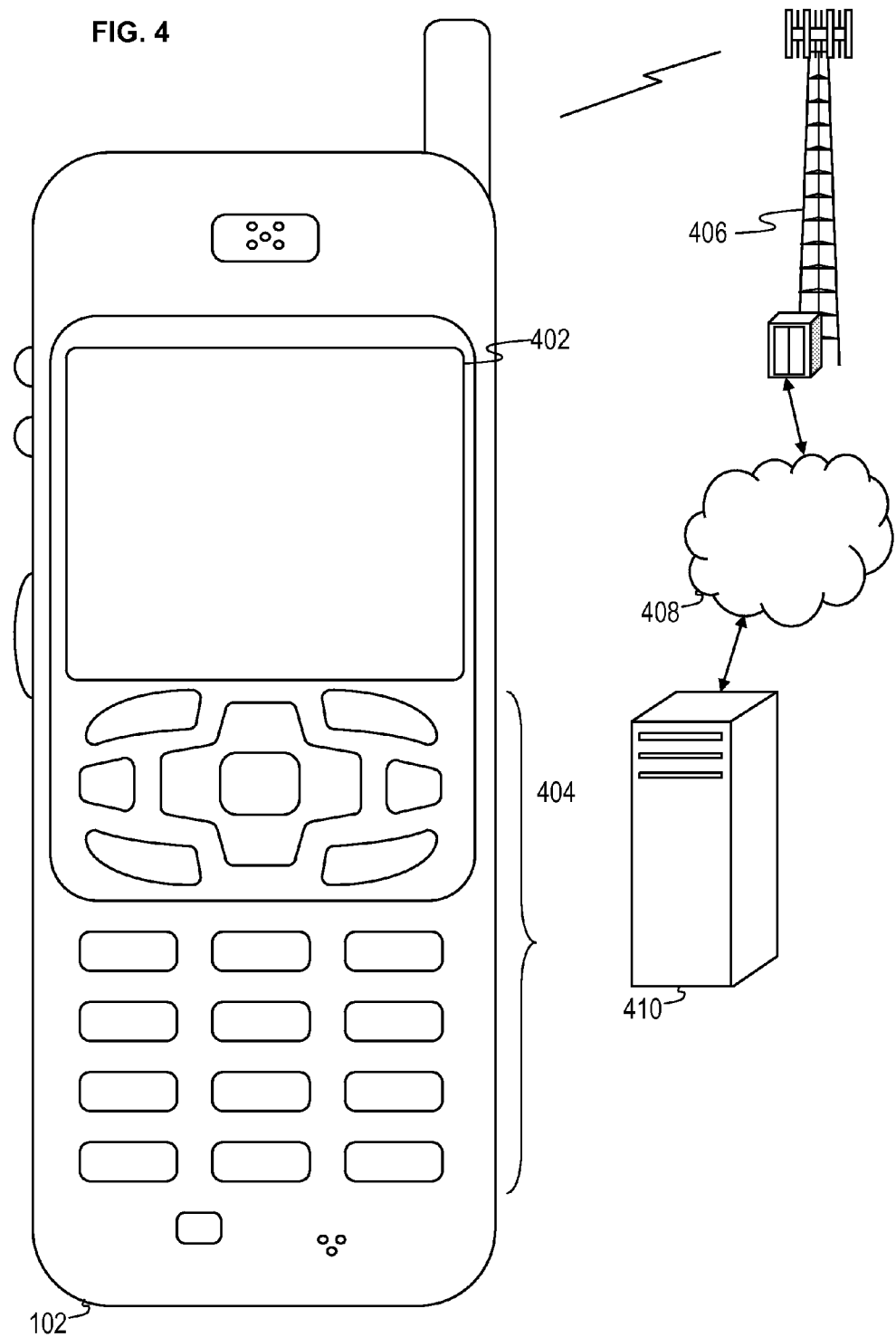
FIG. 4 is an illustration of a portable electronic device according to an embodiment of the disclosure.

FIG. 4 shows a wireless communications system including a mobile device 102. FIG. 4 depicts the mobile device 102, which is operable for implementing aspects of the present disclosure, but the present disclosure should not be limited to these implementations. The mobile device 102 may be an embodiment of the mobile communication device 160, 170, 180 provided by the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application 608 which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The software package 614 may be representative of the software packages 162, 172, 182 provided by the system 100.

Figure 7:
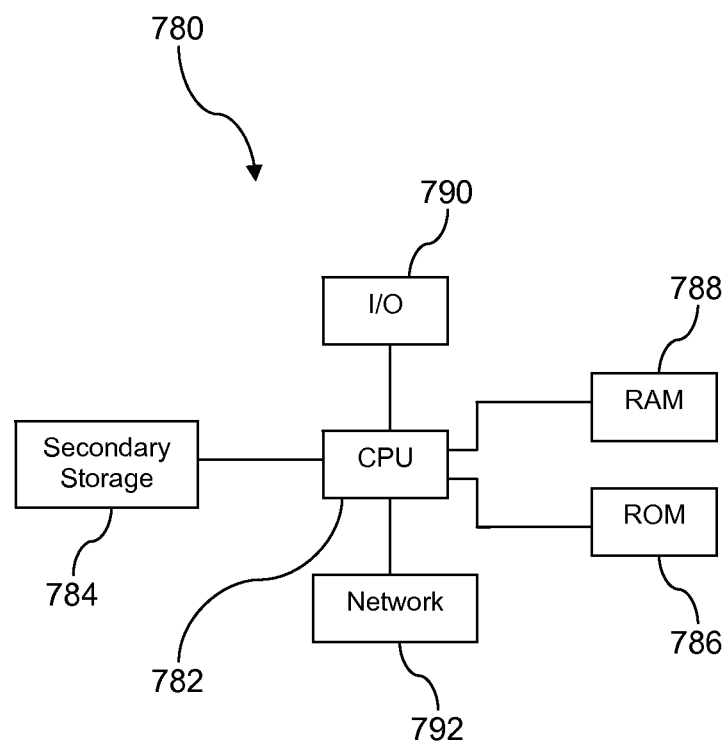
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of mobile communication device provisioning and management, comprising:

receiving, by a provisioning server, at least one provisioning request message from one or more mobile communication mobile devices, the at least one provisioning request message from each of the one or more mobile communication devices containing a unique identifier of the corresponding mobile communication device and a user identifier associated with a user of the corresponding mobile communication device;

identifying, by the provisioning server, provisioning information for each of the one or more mobile communication devices based on a combination of a stored user role and a stored unique identifier that correspond to the received unique identifier and the received user identifier;

provisioning, by the provisioning server, the one or more mobile communication devices at the beginning of a first time period with a service associated with the stored user role based on the identified provisioning information;

tracking, by the provisioning server, usage of the service during the duration of the first time period;

de-provisioning, by the provisioning server, the one or more mobile communication devices at the end of the first time period; and re-provisioning, by the provisioning server, the one or more mobile communication devices at the beginning of a second time period with a different service associated with a different user role.

2. The method of claim 1, wherein the first time period and the second time period are each one of one week, two weeks, or four weeks in duration.

3. The method of claim 1, wherein the stored user role and the different user role are associated with different responsibilities, and wherein the service and the different service provide access to different applications and communications services.

4. The method of claim 1, wherein a set of mobile communication devices including the one or more mobile communication devices at the beginning of a time period is partitioned into at least two subsets, wherein each subset is associated with a role, and wherein mobile communication devices of the set of mobile communication devices assigned to each role are provisioned with services associated with their role.

5. The method of claim 1, wherein the provisioning, the de-provisioning, and the re-provisioning is accomplished partly by exchanging subscriber identity module (SIM) cards associated with the one or more mobile communication devices.

6. The method of claim 1, wherein each of the provisioned first and second services comprise at least one of voice only, voice and data, direct connect only, direct connect, and push-to-talk with particular groups.

7. The method of claim 1, wherein the service comprises a first plurality of software applications and communications services and the different service comprises a second plurality of software applications and communication services, and wherein at least some of the first plurality of software applications and communications services differ from the second plurality of software applications and communications services.

8. The method of claim 7, wherein the provisioning one or more mobile communication devices comprises installing the first plurality of software applications and communications services on the one or more mobile communication devices, wherein the de-provisioning the one or more mobile communication devices comprises deleting the first plurality of software applications and communications services from the one or more mobile communication devices, and wherein the re-provisioning the one or more mobile communication devices comprises installing the second plurality of software applications and communications services on the one or more mobile communication devices.

9. The method of claim 1, wherein the unique identifier contained in the at least one provisioning request message is in a header of the at least one provisioning request message.

10. The method of claim 1, wherein the at least one provisioning request message is sent by each of the one or more mobile communication devices when the user of the corresponding mobile communication device powers on the corresponding mobile communication device or makes a key or voice entry into the corresponding mobile communication device.

11. The method of claim 1, wherein the provisioning information further comprises instructions describing applications and communications services associated with the stored user role to be installed on the one or more mobile communication devices and instructions for invoking a provisioning method associated with the stored user role.

* * * * *